United States Patent [19]

Berg

[11] 4,253,540

[45] Mar. 3, 1981

[54] STEERING SYSTEM FOR COLD ENVIRONMENTS

[75] Inventor: Lawrance F. Berg, Lockport, Ill.

[73] Assignee: Caterpillar Tractor Co., Peoria, Ill.

[21] Appl. No.: 108,908

[22] PCT Filed: Oct. 29, 1979

[86] PCT No.: PCT/US79/00920

§ 371 Date: Oct. 29, 1979

§ 102(e) Date: Oct. 29, 1979

[51] Int. Cl.³ .................... B62D 5/06; F15B 11/16
[52] U.S. Cl. .................... 180/139; 60/384; 60/420; 60/450
[58] Field of Search .............. 180/132, 139, 134; 60/384, 385, 386, 420, 450, 464, 468, 484; 91/446, 448

[56] References Cited

U.S. PATENT DOCUMENTS

| | | | |
|---|---|---|---|
| 3,326,317 | 6/1967 | Marquardt | 180/139 |
| 3,412,822 | 11/1968 | Canning | 180/139 |
| 3,862,643 | 1/1975 | Dezelan et al. | 137/625.63 |
| 3,952,825 | 4/1976 | Beyers | 180/139 |
| 3,991,846 | 11/1976 | Chichester et al. | 180/132 |
| 4,043,419 | 8/1977 | Larson et al. | 180/132 |
| 4,059,042 | 11/1977 | Bridwell et al. | 91/469 |
| 4,071,108 | 1/1978 | Iida | 180/139 |
| 4,117,899 | 10/1978 | Sagaser et al. | 180/6.48 |

Primary Examiner—John J. Love
Assistant Examiner—Donn McGiehan
Attorney, Agent, or Firm—J. W. Burrows

[57] ABSTRACT

A steering system (36) for vehicles (10) in which a device (90) is provided for circulating fluid through the system when operating in a cold environment. The system includes a hand metering unit (58) which is connected to opposite ends of a pilot operated steering valve (42) through a pair of pilot lines (60,62). A pressure reducing valve (94) maintains a continuous flow of fluid to the pilot lines (60,62) at a first predetermined pressure level. A pressure responsive valve (94) positioned between the hand metering unit (58) and a reservoir (40) intermittently passes pilot control fluid, returned to the hand metering unit (58) from the pilot actuation of the steering valve (42), to the reservoir (40) in response to the pressure of such returned fluid reaching a second slightly higher predetermined pressure level such as occurs when the fluid in the system is cold. This passing of cold fluid to the reservoir and the subsequent replacement of such fluid establishes circulation of fluid through the pilot control system and overcomes the problems of increased operator input force and increased system response time caused by cold fluid in the pilot control system.

4 Claims, 2 Drawing Figures

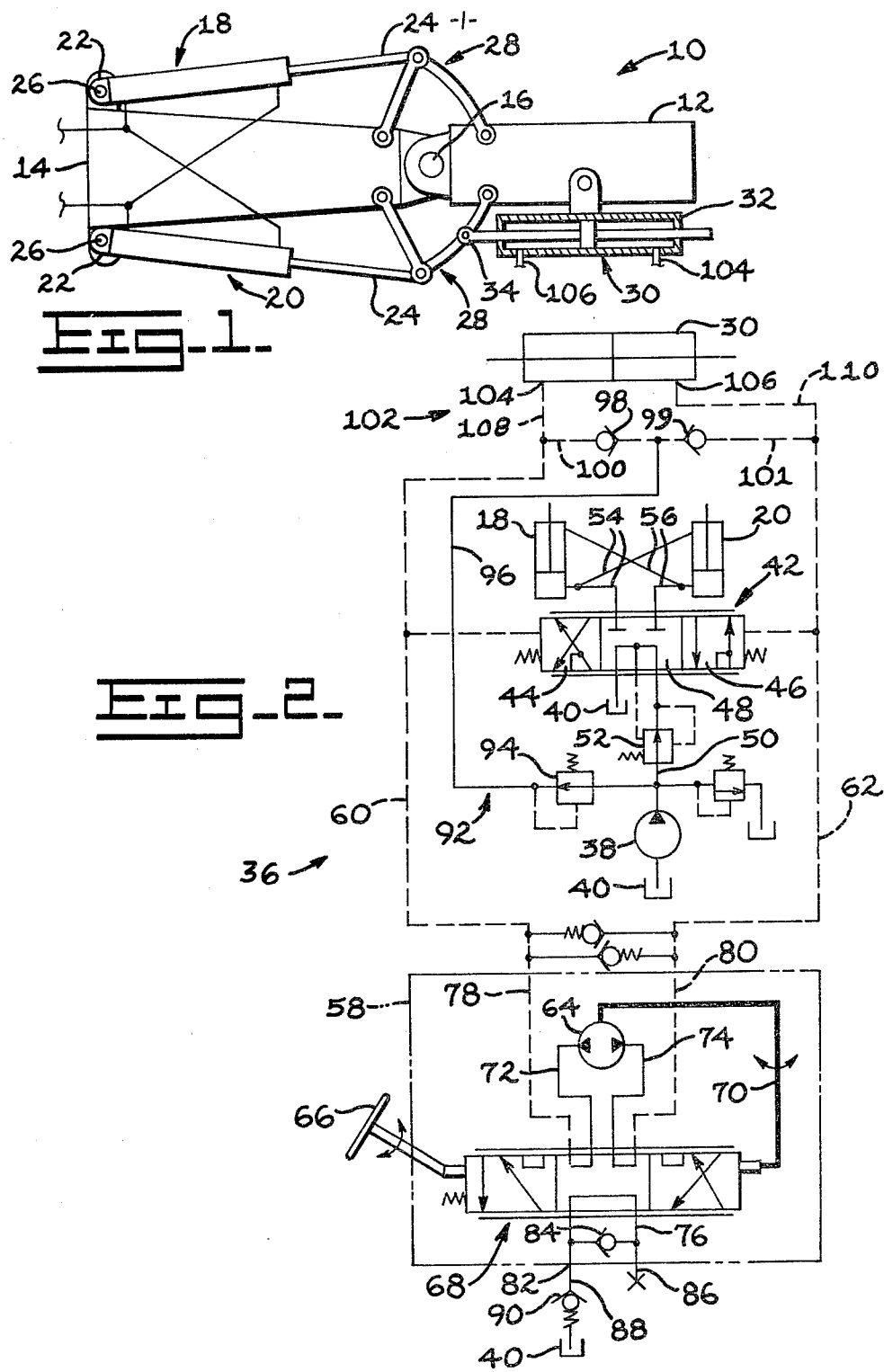

STEERING SYSTEM FOR COLD ENVIRONMENTS

DESCRIPTION

1. Technical Field

This invention relates generally to a steering system and more particularly to a device for circulating fluid through the system when the fluid in the system is cold.

2. Background Art

Current pilot operated steering systems use a closed loop pilot system where the pilot fluid is directed to one side of the steering valve and the returning fluid from the opposite side of the steering valve is again used without the fluid returning to the reservoir. Any loss of fluid due to leakage is made up by supplying fluid directly in the pilot lines. This type of system is set forth in U.S. Pat. No. 3,326,317 to J. F. Marquardt which issued on June 20, 1967. In cold weather, the fluid in the closed loop is very viscous and requires high forces to cause the fluid to move. This higher force must be generated by the operator when initiating a steer input. The cold, viscous fluid also increases the steering response time due to its high resistance to flow. The only way that fluid can be replaced in this closed loop is by replacing fluid in response to fluid that leaks across the ends of the main spool.

Other attempts at solving cold start-up problems in hydraulic systems have been to provide a continuous flow from a source through a control valve to a point near the actuator and back through the valve to the reservoir. This provides a continuous flow of fluid through the lines to prevent the oil from getting cold. An example of a system of this type is set forth in U.S. Pat. No. 4,059,042 to John W. Bridwell et al, issued Nov. 22, 1977. Even though this overcomes the problem of the oil being confined in the control lines, it is inefficient because it requires a continuous flow of fluid which uses horsepower and also does not allow the use of a closed loop pilot control system.

The present invention is directed to overcoming one or more of the problems as set forth above.

DISCLOSURE OF THE INVENTION

In one aspect of the present invention, a steering system has a pilot operated steering valve, a reservoir, and a source of fluid pressure in fluid communication with said steering valve. A hand metering unit has a supply passage, a reservoir return port, and first and second pilot fluid delivery ports. First and second pilot lines connect said first and second delivery ports to opposite ends of said steering valve. Apparatus maintains a continuous fluid flow to each of said pilot lines. A pressure responsive valve is in fluid communication between said reservoir and said reservoir return port. The valve is of a construction sufficient for passing fluid to said reservoir in response to pressure of fluid at said return port.

The invention relates to a steering system for vehicles in which a device is provided for circulating fluid through the system when operating in a cold environment. Cold, viscous fluid in the pilot control system adds effort force to operator's input and increases the system response time. This device provides a path for cold, viscous fluid in a pilot control system to be passed to the reservoir in response to operator's input. The cold, viscous fluid passed to reservoir is made-up with warmer fluid resulting in lower operator input force and quicker system response. While U.S. Pat. No. 3,326,317, noted above, provides a positive make-up fluid, it does not provide any fluid flow to reservoir, other than that which occurs through normal leakage.

BRIEF DESCRIPTION OF THE DRAWINGS

FIG. 1 is a diagrammatic representation of a vehicle having a first member and a second member pivotally movable relative to the first member.

FIG. 2 is a schematic illustration of an embodiment of the present invention.

BEST MODE FOR CARRYING OUT THE INVENTION

With reference to the drawings, and particularly FIG. 1, a vehicle 10 is diagrammatically shown, having a first member 12 and a second member 14 pivotably movable relative to the first member at a pin joint 16. First and second cylinders 18,20 each have a head end and a rod end 22,24. The head ends 22 of the cylinders 18,20 are connected to the second member at points 26, and the rod ends 24 are connected to the first member 12 through linkages 28 in a conventional manner.

A servo-cylinder 30 has a head end 32 connected to the first member 12, and a rod end 34 connected to the second member 14 through linkage 28, in a conventional manner.

Referring to FIG. 2, there is shown a steering system 36 of a type normally associated with earthmoving or construction vehicles. The system 36 is adapted to operate in cold environments without adverse effects on the operator's ability to steer the vehicle due to cold temperatures.

A source of fluid pressure, such as a pump 38, draws fluid from a reservoir 40 and is connected to a pilot operated steering valve 42 which is movable between first, second, and third positions 44,46,48, respectively. At the first position 44, fluid is directed from the pump 38 through conduit 50, flow control valve 52, and conduits 54 to cylinders 18,20 while fluid is returning from cylinders 18,20 through conduits 56 and steering valve 42 to reservoir 40. At the second position 46, fluid is directed from pump 38 to cylinders 18,20 through conduit 50, flow control valve 52, and conduits 56 while fluid is returning from cylinders 18,20 through conduits 54 and steering valve 42 to reservoir 40. At the third position, fluid flow is blocked between the cylinders 18,20 and the pump 38 and reservoir 40, while fluid flow from pump 38 passes through valve 42 and back to reservoir 40.

The steering valve 42 is moved between its respective positions in response to forces exerted there upon by pilot fluid from a hand metering unit 58 through first and second pilot lines 60,62, A suitably hand metering unit 58 is, for example, a Char-Lynn Model W manufactured by the Fluid Power Division of Eaton Corporation of Eden Prairie, Minn. and disclosed in U.S. Pat. No. 3,991,846 to Willard L. Chichester et al, issued Nov. 16, 1976. Hand metering unit 58 includes components as represented schematically inside the broken line area, in which is denoted an orbiting metering pump 64 driven in either direction by a steering wheel 66. A metering spool type valve 68 is connected to metering pump 64 by conduit 72,74 and is spring loaded to an open centered position as shown. The valve 68 is movable between first and second positions by a mechanical linkage 70 according to the rotational direction of metering pump 64. At the first position of valve 68

(valve moved to the left) a fluid supply passage 76 is in fluid communication with a first pilot fluid delivery 78 through the metering pump 64. At the second position of valve 68 (valve moved to the right), the fluid supply passage 76 is in fluid communication with a second pilot fluid delivery port 80 through the metering pump 64. The fluid supply passage 76 is in fluid communication with a reservoir return port 82 through a make-up valve, such as a one-way check valve 84. The fluid supply passage 76 is connected to an inlet port 86 which is blocked. The reservoir return port 82 is connected to reservoir 40 by conduit 88. A pressure responsive valve 90 is located in the conduit 88 between the return port 82 and the reservoir 40 and is responsive to pressure at the return port 82.

Means 92 for maintaining a continuous fluid flow to each of the pilot lines is provided and includes a pressure reducing valve 94 connected to conduit 50. The means 92 delivers fluid through a conduit 96, check valves 98,99 and conduits 100,101 to first and second pilot lines 60,62 at a first predetermined pressure level for example 350 kPa (51 psi).

Feedback means 102 for sensing the relative position of the members 12,14 is provided and can include the servo-cylinder 30 having a head end port 104 and a rod end port 106 connected respectively to first pilot line 60 and second pilot line 62 via conduits 108,110.

Industrial Applicability

Upon starting the vehicle 10, pump 38 supplies a source of fluid pressure to the steering system 36. The pressure reducing valve 94, conduit 96, check valves 98,99 and conduits 100,101 maintains a continuous fluid flow to each of the pilot lines at the first predetermined pressure level.

By turning the steering wheel 66 clockwise the metering pump 64 is driven in a right-hand sense which, through mechanical linkage 70, moves valve 68 to the first position and draws fluid into the metering pump 64 and discharges pressurized fluid to move valve 42 to its first position 44 in a conventional manner. At the first position 44 of valve 42, fluid from pump 38 is directed to the cylinders 18,20 initiating a steer to the right. Simultaneously with pivotable movement of members 12 and 14, the servo-cylinder 30 of the feedback means for sensing the relative position of said members produces a signal responsive to the sensed position of members 12 and 14 and delivers the signal to pilot lines 60,62 and controllably moves the steering valve 42 to its third position 48 in response to the signal. Return flow from the opposite side of valve 42 is returned to the reservoir return port and across the one-way check valve 84 to the fluid supply passage 76 in a closed loop arrangement. When the steering wheel is turned in the opposite direction, the fluid from the supply passage 76 is directed to shift steering valve 42 in the opposite direction to initiate a steer to the left.

With the fluid in the first and second pilot lines 60,62 being very cold and viscous, the fluid will require a higher force to move thus creating a large differential pressure ($\Delta P$) in the lines from the resistance of fluid flow.

In order to offset this extra resistance, the cold, viscous fluid is intermittently passed to reservoir 40 across the pressure responsive valve 90 and is made-up by fluid from the continuous fluid flow means 92. During the start-up sequence of the vehicle 10, the operator will turn steering wheel 66 both directions several times in order to cause the cold fluid in the lines to move. Due to the high $\Delta P$ of the cold oil, the pressure in the first and second pilot lines 60,62 and feedback lines 108 and 110 may be in excess of 700 kPa (102 psi). If for example, the pressure responsive valve 90 is set to open at a second predetermined pressure level of 380 kPa (55 psi), cold, viscous fluid is passed to tank until the pressure level reduces below 380 kPa. Because fluid has been removed from the closed loop pilot system, the pressure will further reduce until it is low enough for the first predetermined pressure level of 350 kPa to refill the closed loop.

This intermittent discharging of cold viscous fluid to reservoir 40 and the recharging of the closed loop with warmer oil results in the cold, viscous fluid from the first and second pilot lines 60,62 and feedback lines 108 and 110 being replaced with warmer fluid. During normal operation when the fluid is warm, no fluid will be passed to reservoir, because the pressure responsive valve is at a higher level than the continuous fluid flow means as established by pressuring reducing valve 94. The pilot system 36 will be maintained at the first predetermined pressure level and any loss of fluid from the closed loop due to leakage will automatically be made-up.

Other aspects, objects and advantages of this invention can be obtained from a study of the drawings, the disclosure and the appended claims.

I claim:

1. In a steering system (36) for a vehicle (10) having a pilot operated steering valve (42), a reservoir (40), a source (38) of fluid pressure in fluid communication with said steering valve (42); a hand metering unit (58) having a reservoir return port (82), a supply passage (76), first and second pilot fluid delivery ports (78)(80), and a make-up valve (84) interconnecting said return port (82) with said supply passage (76); first and second pilot lines (60)(62) connecting said first and second pilot fluid delivery ports (78)(80) to opposite ends of said steering valve (42), the improvement comprising:

means (92) for maintaining a continuous fluid flow to each of said pilot lines (60)(62) at a first predetermined pressure level; and a pressure responsive valve (90) in fluid communication between said reservoir (40) and said reservoir return port (82), said valve (90) being of a construction sufficient for passing fluid to said reservoir (40) in response to pressure of fluid at said return port (82) being at a second predetermined pressure level higher than said first predetermined pressure level.

2. The system, as set forth in claim 1, wherein said means (92) for maintaining a continuous fluid flow includes a pressure reducing valve (94) in fluid communication with said source (38) and being connected to said first and second pilot lines (60)(62).

3. The system, is set forth in claim 1, wherein said vehicle (10) has a first member (12);

a second member (14) pivotally movable relative to the first member (12);

feedback means (102) for sensing the relative position of said members (12)(14) producing a signal responsive to said sensed position, delivering said signal to said pilot lines (60)(62), and controllably moving said steering valve (42) in response to said signal.

4. The system, as set forth in claim 3, wherein said feedback means (102) includes a servo-cylinder (30) having a head end (32) attached to the first member (12) and a rod end (34) attached to the second member (14), said head and rod ends (32)(34) of the servo-cylinder (30) being in fluid communication with the first and second pilot lines (60)(62), respectively.

* * * * *